United States Patent
Yamanaka et al.

(10) Patent No.: US 8,477,199 B2
(45) Date of Patent: Jul. 2, 2013

(54) IMAGING APPARATUS, IMAGE PROCESSING METHOD, AND COMPUTER PROGRAM PRODUCT FOR PREVENTING FALSE MOTION VECTOR DETECTION

(75) Inventors: Yuji Yamanaka, Kanagawa (JP); Haike Guan, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 84 days.

(21) Appl. No.: 12/904,590

(22) Filed: Oct. 14, 2010

(65) Prior Publication Data

US 2011/0122264 A1    May 26, 2011

(30) Foreign Application Priority Data

Nov. 24, 2009  (JP) ................................. 2009-265951
May 28, 2010  (JP) ................................. 2010-123530

(51) Int. Cl.
  *H04N 5/225*  (2006.01)
(52) U.S. Cl.
  USPC .................... 348/208.1; 348/154; 348/208.4; 348/208.6
(58) Field of Classification Search
  USPC .......................................... 348/208.1–208.16
  See application file for complete search history.

(56) References Cited

U.S. PATENT DOCUMENTS

| | | | | |
|---|---|---|---|---|
| 7,853,041 | B2 * | 12/2010 | Shamaie | 382/103 |
| 2004/0252230 | A1 | 12/2004 | Winder | |
| 2006/0221215 | A1 * | 10/2006 | Ito | 348/252 |
| 2008/0007620 | A1 * | 1/2008 | Wang et al. | 348/154 |
| 2008/0107307 | A1 * | 5/2008 | Altherr | 382/107 |
| 2008/0225127 | A1 * | 9/2008 | Ming | 348/208.99 |
| 2008/0246848 | A1 * | 10/2008 | Tsubaki et al. | 348/208.4 |
| 2009/0109304 | A1 * | 4/2009 | Guan | 348/240.99 |

FOREIGN PATENT DOCUMENTS

| | | |
|---|---|---|
| EP | 2 028 840 A2 | 2/2009 |
| EP | 2 101 486 A2 | 9/2009 |
| JP | 2006-287814 | 10/2006 |
| JP | 2009-110137 | 5/2009 |
| JP | 2010-39946 | 2/2010 |

OTHER PUBLICATIONS

Extended European Search Report issued Feb. 9, 2012, in Patent Application No. 10190740.0.

* cited by examiner

*Primary Examiner* — John Villecco
*Assistant Examiner* — Dwight C Tejano
(74) *Attorney, Agent, or Firm* — Oblon, Spivak, McClelland, Maier & Neustadt, L.L.P.

(57) ABSTRACT

An imaging apparatus includes: an imaging unit that captures an image by photoelectrically converting a subject image; a feature calculating unit that calculates, per region included in the image, a feature value related to suitability for motion detection; a region-motion detecting unit that detects a motion vector per the region; and a whole-motion calculating unit that calculates a motion quantity of a whole image from the feature value and the motion vector.

12 Claims, 4 Drawing Sheets

FIG. 3
| (1,1) | (1,2) | (1,3) |
|---|---|---|
| (2,1) | (2,2) | (2,3) |
| (3,1) | (3,2) | (3,3) |
IMAGE REGION P
FIG. 4A
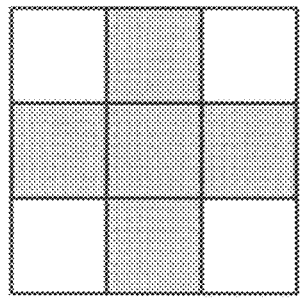
FIG. 4B
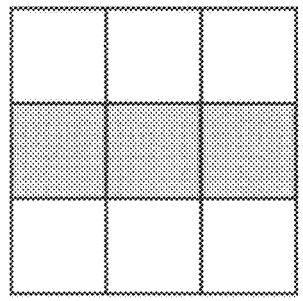
FIG. 4C
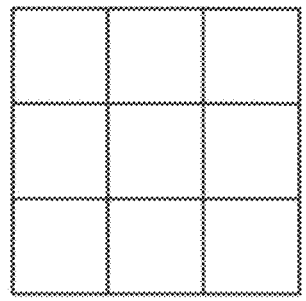
FIG. 5
| EIGENVALUES | PATTERN IN REGION |
|---|---|
| BOTH $d_1$ AND $d_2$ ARE LARGE | CORNER PATTERN |
| $d_1$ IS SMALL; $d_2$ IS LARGE | STRAIGHT-LINE PATTERN |
| BOTH $d_1$ AND $d_2$ ARE SMALL | NO PATTERN |

US 8,477,199 B2

IMAGING APPARATUS, IMAGE PROCESSING METHOD, AND COMPUTER PROGRAM PRODUCT FOR PREVENTING FALSE MOTION VECTOR DETECTION

CROSS-REFERENCE TO RELATED APPLICATIONS

The present application claims priority to and incorporates by reference the entire contents of Japanese Patent Application No. 2009-265951 filed in Japan on Nov. 24, 2009 and Japanese Patent Application No. 2010-123530 filed in Japan on May 28, 2010.

BACKGROUND OF THE INVENTION

1. Field of the Invention

The present invention is directed generally to an imaging apparatus, an image processing method, and a computer program product.

2. Description of the Related Art

Conventionally, there are techniques for detecting a motion vector of a whole image to perform correction of blurring associated with motion of a digital camera by movement of a user's hands. For instance, an invention is disclosed in Japanese Patent Application Laid-open No. 2006-287814, which relates to an imaging apparatus or the like that uses an AF value of each region when evaluating a motion vector per region obtained by dividing a frame of a subject in a matrix.

In the invention related to the imaging apparatus or the like disclosed in Japanese Patent Application Laid-open No. 2006-287814, in order to prevent an object unrelated to the subject to be captured from adversely affecting determination of the motion vector, an AF evaluation value of a region including a focused object is made higher than an AF evaluation value of an unfocused region and the motion vector per region is weighted.

However, in the invention related to the imaging apparatus and the like disclosed in Japanese Patent Application Laid-open No. 2006-287814, a case in which an edge portion of an object or the like is included in a region is not considered. An AF evaluation value indicates contrast of an image and is large in a region including an edge portion.

When detecting motion of a region including an edge, the motion of the region including the edge may not be detected if a direction of motion of a whole image is the same as a direction in which the edge extends. Sometimes motion in the direction in which the edge extends is detected even if there is no motion of the region.

Hence, using an AF evaluation value in weighting a motion vector per region tends to cause false detection when there is relative motion in an edge direction between an imaging apparatus and a subject.

SUMMARY OF THE INVENTION

It is an object of the present invention to at least partially solve the problems in the conventional technology.

According to an aspect of the present invention, an imaging apparatus includes: an imaging unit that captures an image by photoelectrically converting a subject image; a feature calculating unit that calculates, per region included in the image, a feature value related to suitability for motion detection; a region-motion detecting unit that detects a motion vector per the region; and a whole-motion calculating unit that calculates a motion quantity of a whole image from the feature value and the motion vector.

According to another aspect of the present invention, an image processing method includes: capturing an image by photoelectrically converting a subject image; calculating, per region included in the image, a feature value related to suitability for motion detection; detecting a motion vector per the region; and calculating a motion quantity of a whole image from the feature value and the motion vector.

According to still another aspect of the present invention, a computer program product includes a computer-usable medium having computer-readable program codes embodied in the medium. The program codes when executed causes a computer to execute the image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an explanatory diagram of pixels, for which a region feature value is to be calculated;

FIGS. 4A to 4C are diagrams illustrating examples of a pixel pattern in an image region P;

FIG. 5 is a table listing examples of distinguishing conditions;

DETAILED DESCRIPTION OF THE PREFERRED EMBODIMENTS

Exemplary embodiments of the present invention are described below with reference to the accompanying drawings. In the embodiments described herein, a "straight-line pattern" refers to a pattern of a straight line formed of an edge portion of an object or the like included in an image.

Figure 1:
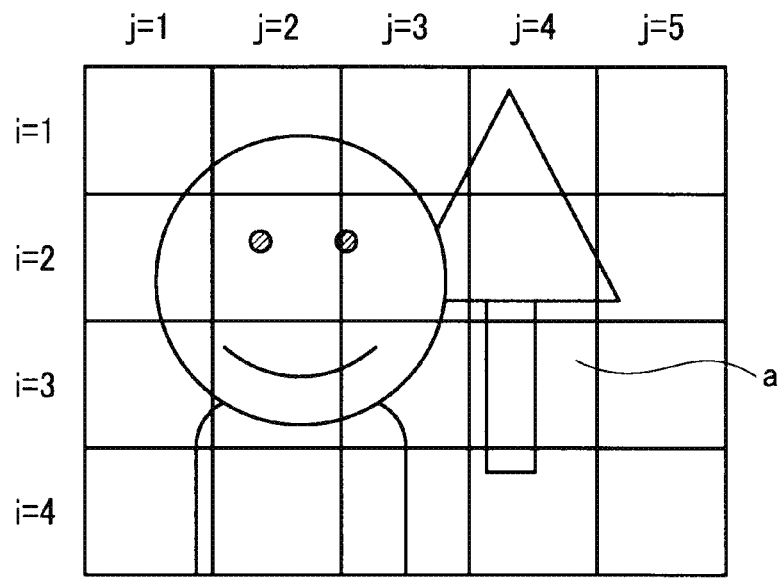
FIG. 1 is a diagram of an example of an image obtained by an imaging apparatus according to an embodiment of the present invention.

FIG. 1 is a diagram of an example of an image obtained by an imaging apparatus according to an embodiment of the present invention. The image in FIG. 1 is divided into four rows of i=1 to 4 and five columns of j=1 to 5, and thus has a total of 20 regions.

In the image in FIG. 1, a region "a" of (i=3, j=4), for example, includes a straight-line pattern. In motion detection with respect to the region "a", faults may occur, such as no motion being detected when there is relative motion between an imaging apparatus and a subject in a same direction as a direction in which a straight line extends, or motion being detected when there is actually no relative motion.

In the present embodiment, an imaging apparatus is described, which is capable of more accurately detecting a motion quantity of a whole image by appropriately weighting a motion vector of a region, which includes a straight-line pattern like the region "a".

Figure 2:
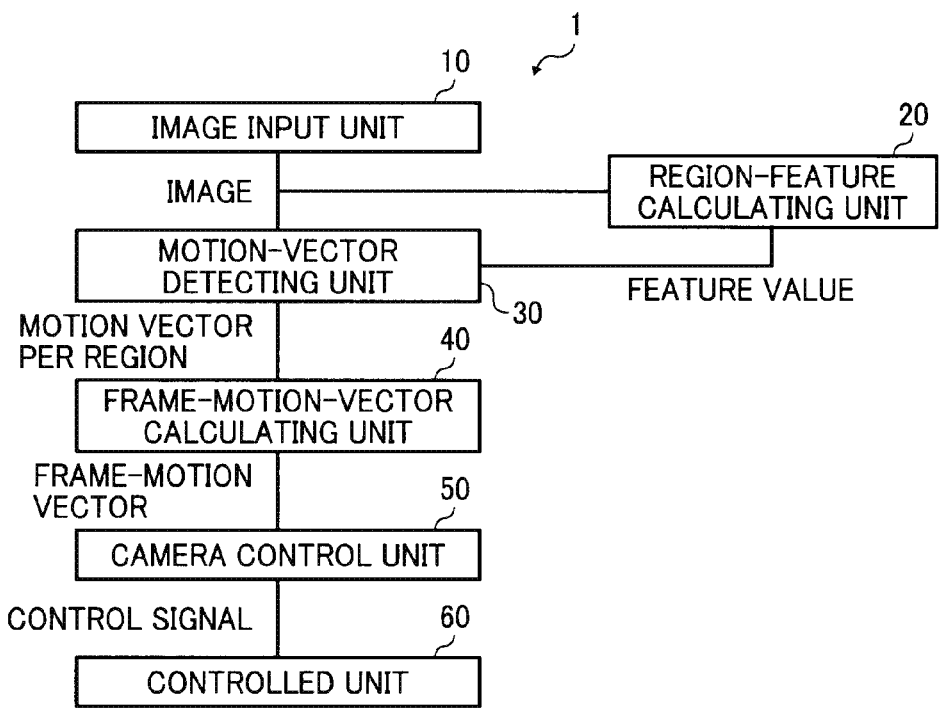
FIG. 2 is a block diagram of a functional configuration of the imaging apparatus according to the embodiment.

FIG. 2 is a block diagram of a functional configuration of an imaging apparatus according to the embodiment. An imaging apparatus 1 in FIG. 2 includes an image input unit 10, a region-feature calculating unit 20, a motion-vector detecting unit 30, a frame-motion-vector calculating unit 40, a camera control unit 50, and a controlled unit 60.

The image input unit 10 generates image data from light that is input, and outputs the image data. The image input unit 10, for example, receives the light that has passed a not-illustrated optical system including a lens and a shutter. The received light is received by an imaging device, in which photosensitive elements are arranged in a plane, converted into a signal electric charge corresponding to an amount of incident light, and output as the image data.

The region-feature calculating unit 20 calculates a region feature value pixel by pixel. FIG. 3 is an explanatory diagram of pixels, for which a region feature is to be calculated. Distinction of a pattern included in an image region "P" of three by three pixels is now considered. A gradient covariance matrix "Z" with respect to the image region "P" is calculated for pattern distinction. The gradient covariance matrix "Z" is expressed by Equation (1) below.

$$Z = \begin{pmatrix} s_{xx} & s_{xy} \\ s_{xy} & s_{yy} \end{pmatrix}$$

$$= \begin{pmatrix} \sum_{x=1}^{3}\sum_{y=1}^{3}(P(x+1,y)-P(x-1,y))^2 & \sum_{x=1}^{3}\sum_{y=1}^{3}(P(x+1,y)-P(x-1,y))(P(x,y+1)-P(x,y-1)) \\ \sum_{x=1}^{3}\sum_{y=1}^{3}(P(x+1,y)-P(x-1,y))(P(x,y+1)-P(x,y-1)) & \sum_{x=1}^{3}\sum_{y=1}^{3}(P(x,y+1)-P(x,y-1))^2 \end{pmatrix} \quad (1)$$

Equation (1) requires values, such as P(0, 1), P(1, 0), and P(1, 4), but because an image exists outside the image region P in an actual image, values thereof may be used. If a size of a region is not three by three pixels, similar calculation is possible by adjusting a range of Σ in Equation (1) to the size of the region.

Relation between a pattern included in the image region "P" and the gradient covariance matrix "Z" is described below. Three patterns are now considered as illustrated in FIGS. 4A to 4C. FIGS. 4A to 4C illustrate a corner pattern, an exemplary straight-line pattern, and no pattern, respectively. When a gradient covariance matrix "Z" is obtained for each pattern, the corner pattern in FIG. 4A has diagonal elements of positively large values and off diagonal elements of small values. In the straight-line pattern in FIG. 4B, one of diagonal elements is of a positively large value, and the other one of the diagonal elements is of a small value. In the no-pattern in FIG. 4C, both diagonal elements and off diagonal elements are of small values.

Eigenvalues of a certain matrix "A" may be referred to as diagonal elements of a matrix "B" that is obtained by rotating a coordinate system of the matrix "A" to make off-diagonal elements zero. Rotation of an image is equivalent to rotation of a coordinate system of a matrix.

Hence, a pattern included in a region "W", which is an arbitrary region in an image, is distinguishable into a corner pattern, an edge (straight-line) pattern, and no pattern by obtaining eigenvalues "$d_1$" and "$d_2$", where $d_1 \leq d_2$, of the gradient covariance matrix "Z" of the region "W". Distinguishing conditions are given in FIG. 5.

Eigenvalues "$d_1$" and "$d_2$" of the gradient covariance matrix "Z" are expressed by Equations (2-1) and (2-2) below.

$$d_1 = \frac{s_{xx}+s_{yy}-\sqrt{(s_{xx}-s_{yy})^2+4s_{xy}^2}}{2} \quad (2\text{-}1)$$

$$d_2 = \frac{s_{xx}+s_{yy}+\sqrt{(s_{xx}-s_{yy})^2+4s_{xy}^2}}{2} \quad (2\text{-}2)$$

Since a region including a corner suitable for motion detection is preferably distinguished to be used, "$d_1$" is employed as a feature value "d". "Suitable for motion detection" means that false detection is rare and highly reliable detection is possible.

The feature value "d" in a region including a straight-line portion or a region with hardly any texture becomes small. In such a region, false detection is likely to occur and reliability of a detected result is low.

Hence, it is possible to calculate a feature value for distinguishing whether or not an arbitrary region in the image is suitable for motion detection. For example, by calculating a feature value "$d_{ij}$" in each of the 20 regions illustrated in FIG. 1, whether each region is suitable for motion detection is determined quantitatively and the determination is utilized in subsequent motion detection and calculation of a motion vector of a whole frame.

In FIG. 1, a feature value "d" of a region of (i, j)=(4, 5) is small because the region has no texture. A feature value "d" of a region (i, j)=(3, 4) is also small because although the region has texture, the region has only straight-line portions. In contrast, a feature value "d" of a region (i, j)=(4, 4) or a region (i, j)=(1, 4) is large because these regions have corner portions suitable for motion detection.

Referring back to FIG. 2, the motion-vector detecting unit 30 detects a motion vector per region. The motion-vector detecting unit 30 may perform motion detection with respect to all of the 20 regions in the image in FIG. 1, or regions not subjected to the motion detection may be provided.

For example, if regions where both "i" and "j" are odd numbers and regions where both "i" and "j" are even numbers are to be targets of the motion detection, the targeted regions become a checkered pattern. Consequently, it is possible to perform the motion detection throughout the entire image while reducing a processing time period.

Alternatively, for example, thresholding of the feature value "$d_{ij}$" calculated by the region-feature calculating unit 20 may be performed to select regions to be subjected to the motion detection. More specifically, a threshold value "D" may be set, and motion detection may be performed in regions where $d_{ij} > D$ but not in regions where $d_{ij} \leq D$.

Because "$d_{ij}$" indicates a degree of suitability of a region (i, j) for motion detection, it is possible to improve reliability of detected motion vectors and reduce the processing time period.

The motion-vector detecting unit 30 detects a motion vector "$V_{ij}$" per region in the following manner. Examples of a method of calculating motion vectors from images include a method that utilizes differential images, a method that utilizes spatio-temporal differentiation, and a block matching method that uses a template. As one example, the block matching method is described below.

Figure 6:
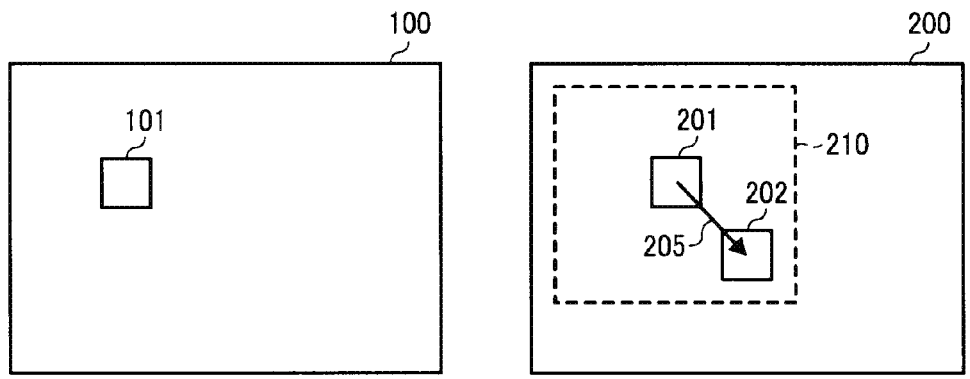
FIG. 6 is an explanatory diagram of a block matching method.

The same objects in two images captured at different times are associated with each other, and a motion vector is detected as the object's amount of movement. FIG. 6 is an explanatory diagram for the block matching method. In FIG. 6, an image 100 is an image captured at time t0 and an image 200 is an image captured at time t1 different from time to.

A motion vector of a region 101 at a position (i, j) in the image 100 is detected. The region 101 includes a total of M×N pixels arranged in a matrix with "M" columns and "N" rows. Using this region 101 as a template, similarities are calculated for a neighboring region 210 around a region 201 that is located at the same position as the region 101 in the image 200, and a position having the highest similarity or a position having the lowest dissimilarity is determined as a corresponding region.

If the corresponding region of the template is a region 202 in FIG. 6, the motion vector is a vector 205 directed from the center of the region 201 to the center of the region 202. This is referred to as a motion vector "$V_{ij}$".

As an index that indicates a similarity or dissimilarity, for example, a sum of absolute differences (SAD) may be used. The SAD is expressed by Equation (3) below. The SAD represents dissimilarity.

$$R(x, y) = \sum_{m}^{M} \sum_{n}^{N} |(I(m + x, n + y) - T(m, n))| \quad (3)$$

In Equation (3), "R" denotes the dissimilarity calculated as the SAD, "I" denotes a partial region in the image 200 that matches the region 201 when x=y=0, and "T" denotes the template region 101. The SADs are calculated by changing values of "x" and "y" in the neighboring region 210. The corresponding region 202 is determined from "$x_{min}$" and "$y_{min}$", which are values of "x" and "y" when a value of the SAD is the smallest. That is, $V_{ij}=(x_{min}, y_{min})$.

Referring back to FIG. 2, the frame-motion-vector calculating unit 40 calculates a motion vector "V" of a whole frame. The motion vector "V" of the whole frame may be obtained, for example, by Equation (4).

$$V = \sum_{i} \sum_{j} d_{ij} v_{ij} / \sum_{i} \sum_{j} d_{ij} \quad (4)$$

Since the vector "V" expressed by Equation (4) is calculated from weighted vectors, influence by false detection likely to occur in a straight-line region or the like is small or eliminated. Accordingly, the vector "V" is expected to be more highly accurate than a vector obtained by weighting of AF evaluation values that are simple results of contrast detection.

In Equation (4), the feature value "$d_{ij}$" is used in the weighting of the motion vectors, but not being limited to this example, other weight coefficients having positive correlation with the feature value "$d_{ij}$" may be used.

The camera control unit 50 controls a camera according to the motion vector "V" of the whole frame calculated by the frame-motion-vector calculating unit 40. More specifically, an image is captured, in which blurring caused by relative motion between the imaging apparatus and the subject has been suppressed.

The controlled unit 60 includes a shutter and an imaging device and obtains image data according to a shutter speed and sensitivity of the imaging device, which are based on a control signal from the camera control unit 50.

Figure 7:
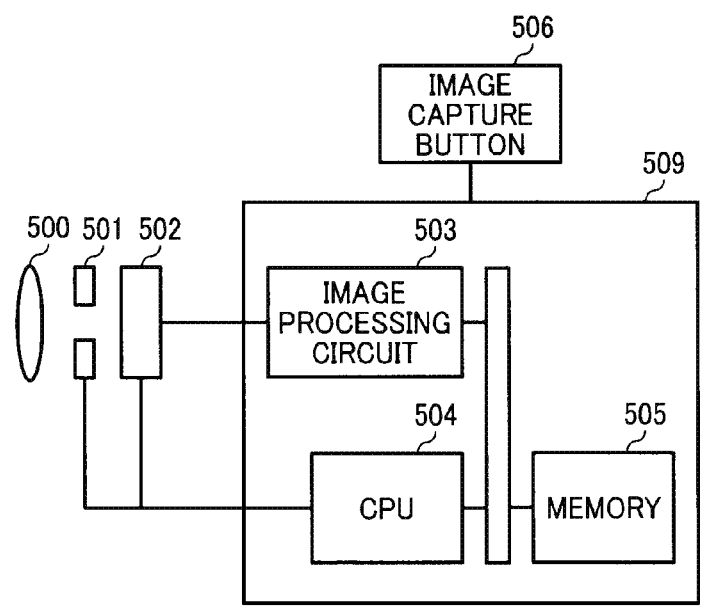
FIG. 7 is a diagram of a hardware configuration of the imaging apparatus according to the embodiment.

FIG. 7 is a diagram illustrating a hardware configuration of the imaging apparatus according to the embodiment. The imaging apparatus in FIG. 7 includes a lens 500, a shutter 501, an imaging device 502, an image capture button 506, and a control unit 509.

Light that has passed the lens 500 passes the shutter 501, is photo-electrically converted at the imaging device 502, and input into the control unit 509 as digital image data.

The control unit 509 includes an image processing circuit 503, a central processing unit (CPU) 504, and a memory 505. The image processing circuit 503 performs, with respect to the image data, calculation of a feature value per region, detection of motion vectors, and detection of motion of a whole-frame.

The CPU 504 executes a computer program stored in the memory 505 or the like, thereby controlling the entire imaging apparatus. The memory 505 stores, in addition to the program executed by the CPU 504, image data to be processed by the image processing circuit 503, image data processed by the image processing circuit 503, and the like.

When the image capture button 506 is depressed by a user, light that has passed the lens 500 is subjected to photoelectric conversion in the imaging device 502 and then to processing performed by the control unit 509, and image data to be provided to the user are generated. Inputting of the image data from the lens 500 and the imaging device 502 to the control unit 509 is continuously performed, and by the user depressing the image capture button 506, the image data are stored in the memory 505.

Correspondence between the functional blocks illustrated in FIG. 2 and the hardware configuration illustrated in FIG. 7 will now be explained. The image processing circuit 503 corresponds to the region-feature calculating unit 20, the motion-vector detecting unit 30, and the frame-motion-vector calculating unit 40. The CPU 504 corresponds to the camera control unit 50. The controlled unit 60 corresponds to the lens 500, the shutter 501, and the imaging device 502.

Figure 8:
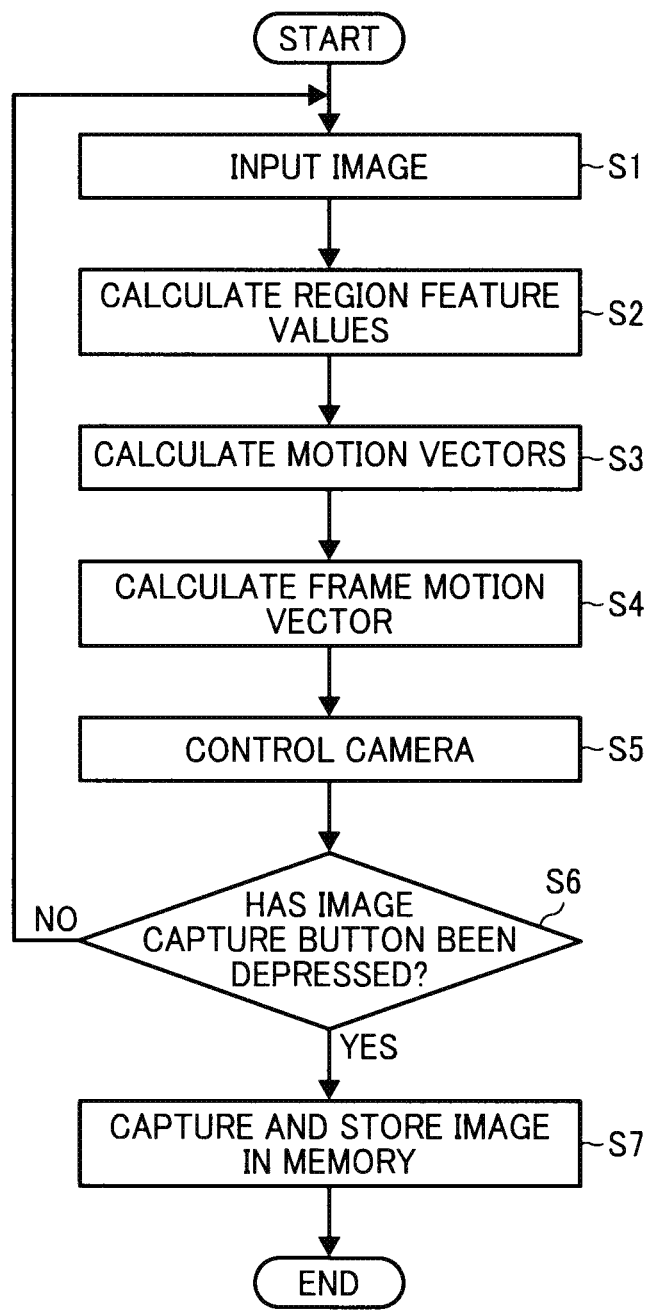
FIG. 8 is a flowchart for an image processing method according to the embodiment.

FIG. 8 is a flowchart for an image processing method according to the embodiment. In the image processing method illustrated in FIG. 8, with respect to image data that are input, a motion vector "V" of a whole frame is detected, and the image data, for which blurring of image has been suppressed, are stored in a memory.

At Step S1 in FIG. 8, digital image data are fed to the control unit 509. Subsequently to Step S1, at Step S2, the region-feature calculating unit 20 calculates a feature value "$d_{ij}$" per region. Subsequently to Step S2 at Step S3, the motion-vector detecting unit 30 calculates a motion vector "$V_{ij}$" per region. Subsequently to Step S3 at Step S4, the frame-motion-vector calculating unit 40 calculates a motion vector "V" of a whole frame.

Subsequently to Step S4 at Step S5, the CPU 504 sets a control parameter for the controlled unit 60 based on the motion vector "V" of the whole frame calculated at Step S4 and transmits a control signal.

More specifically, if, for example, the motion vector "V" of the whole frame is large, the shutter speed of the shutter 501 and sensitivity of the imaging device are increased. This allows capturing of an image without blurring even if there is relative motion between the imaging apparatus and the subject. If the value of the motion vector "V" of the whole frame is small, the shutter speed of the shutter 501 is reduced. This allows capturing of an image with less noise.

Subsequently to Step S5 at Step S6, the CPU 504 determines whether or not the image capture button 506 has been depressed by a user. If the image capture button 506 has been depressed, the method proceeds to Step S7, and if the image capture button 506 has not been depressed, the method returns to Step S1 to repeat the procedure.

Subsequently to Step S6 at Step S7, the CPU 504 stores image data output from the imaging device 502 according to the set shutter speed and sensitivity of the imaging device into the memory 505.

The image processing method according to the embodiment of the present invention may be executed by, for example, a personal computer (PC) or the like. For example, a CPU may use a main memory like a RAM as a work area and perform the execution, according to a program stored in a ROM, a hard disk device, or the like.

According to an aspect of the present invention, it is possible to provide an imaging apparatus, an image processing method, and a computer program product, which perform motion detection in which false detection does not easily occur even if relative motion between the imaging apparatus and a subject is approximately in the same direction as a straight-line pattern in an image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging apparatus, comprising:
an imaging unit that captures an image by photoelectrically converting a subject image;
a feature calculating unit that calculates, per each of plural regions included in the image, a feature value related to suitability for motion detection;
a region-motion detecting unit that detects a motion vector per each of the regions; and
a whole-motion calculating unit that calculates a motion quantity of a whole image from the feature values and the motion vectors, wherein
the whole-motion calculating unit
multiplies the motion vectors with a corresponding feature value that is related to the suitability for motion detection, and
calculates a sum of the motion vectors that are multiplied with the corresponding feature value, and
each feature value is an eigenvalue of a gradient covariance matrix of the region.

2. The imaging apparatus according to claim 1, wherein each feature value enables distinction among a corner-pattern region, a straight-line-pattern region, and a no-pattern region.

3. The imaging apparatus according to claim 1, wherein the eigenvalue is a smaller one of two eigenvalues of the gradient covariance matrix.

4. The imaging apparatus according to claim 1, wherein the region-motion detecting unit sets a range to be subjected to the motion detection based on each feature value.

5. The imaging apparatus according to claim 1, wherein the whole-motion calculating unit calculates the motion quantity by using motion vectors that have been weighted based on a corresponding feature value or on a value related to the corresponding feature value.

6. The imaging apparatus according to claim 1, further comprising a control unit that controls the imaging unit based on the motion quantity calculated by the whole-motion calculating unit.

7. The imaging apparatus according to claim 6, wherein the control unit controls the imaging unit to prevent the image captured by the imaging unit from blurring.

8. The imaging apparatus according to claim 1, wherein the plural regions combined make up the image.

9. An image processing method, comprising:
capturing an image by photoelectrically converting a subject image;
calculating, per each of plural regions included in the image, a feature value related to suitability for motion detection;
detecting a motion vector per each of the regions; and
calculating a motion quantity of a whole image from the feature values and the motion vectors, wherein
the calculating the motion quantity includes
multiplying the motion of vectors with a corresponding feature value that is related to the suitability for motion detection, and
calculating a sum of the motion vectors that are multiplied with the corresponding feature value, and
each feature value is an eigenvalue of a gradient covariance matrix of the region.

10. The image processing method according to claim 9, wherein the plural regions combined make up the image.

11. A non-transitory computer program product, comprising a computer-usable medium having computer-readable program codes embodied in the medium, the program codes when executed causing a computer to execute an image processing method, comprising:
capturing an image by photoelectrically converting a subject image;
calculating, per each of plural regions included in the image, a feature value related to suitability for motion detection;
detecting a motion vector per each of the regions; and
calculating a motion quantity of a whole image from the feature values and the motion vectors, wherein
the calculating the motion quantity includes
multiplying the motion of vectors with a corresponding feature value that is related to the suitability for motion detection, and
calculating a sum of the motion vectors that are multiplied with the corresponding feature value, and
each feature value is an eigenvalue of a gradient covariance matrix of the region.

12. The non-transitory computer program product according to claim 11, wherein the plural regions combined make up the image.

* * * * *